United States Patent [19]

Beasley et al.

[11] Patent Number: 4,894,640
[45] Date of Patent: Jan. 16, 1990

[54] REAR SIGNAL LIGHT SYSTEM FOR AUTOMOTIVE VEHICLES

[76] Inventors: Jerry W. Beasley, 645 Dutchman Dr.; Robert H. Jennings, 4368 Baton Rouge Dr., both of Hermitage, Tenn. 37076

[21] Appl. No.: 840,196

[22] Filed: Mar. 17, 1986

[51] Int. Cl.⁴ .............................................. B60Q 1/26
[52] U.S. Cl. .................................... 340/464; 340/467; 340/479; 200/61.89
[58] Field of Search ...................... 340/66, 69, 71, 62, 340/136, 72, 94, 74, 84; 180/271, 282; 200/61.89, 86.5

[56] References Cited

U.S. PATENT DOCUMENTS

| | | | |
|---|---|---|---|
| 2,758,249 | 8/1956 | Garrigus | 340/66 |
| 2,800,545 | 7/1957 | Pellegrino | 340/71 |
| 2,822,441 | 2/1958 | Fortney | 200/61.89 |
| 3,171,917 | 3/1965 | Leichsenring | 340/71 |
| 3,395,388 | 7/1968 | Hendrickson | 340/66 |
| 3,514,623 | 5/1970 | Ballard | 340/71 |
| 3,921,750 | 11/1975 | Shames | 340/71 |
| 4,021,775 | 5/1977 | Leu | 340/71 |
| 4,170,723 | 10/1979 | Arsoy | 340/69 |
| 4,173,012 | 10/1979 | Burger | 340/71 |
| 4,224,598 | 9/1980 | Ostrowski | 340/66 |
| 4,404,439 | 9/1983 | Leighton | 200/61.89 |
| 4,470,036 | 9/1984 | Doerr et al. | 340/66 |
| 4,730,181 | 3/1988 | Perkins | 340/71 |

Primary Examiner—Joseph A. Orsino
Assistant Examiner—Brent A. Swarthout
Attorney, Agent, or Firm—Harrington A. Lackey

[57] ABSTRACT

A signal light system for an automotive vehicle including a lamp housing in which is mounted an amber warning lamp and a red warning lamp for support on the rear portion of the vehicle. The system further includes an accelerator pedal housing supporting an accelerator switch member within the housing and adjacent the pedal tread. The accelerator pedal housing is mounted on an existing accelerator link arm in the automotive vehicle and the accelerator switch member is electrically connected between the existing ignition circuit and the amber warning light. The red warning light is connected into the existing brake switch circuit for illumination upon depression of the existing brake pedal.

3 Claims, 2 Drawing Sheets

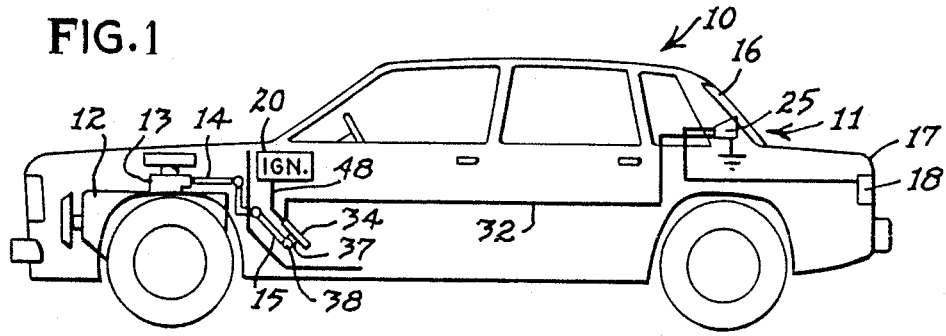
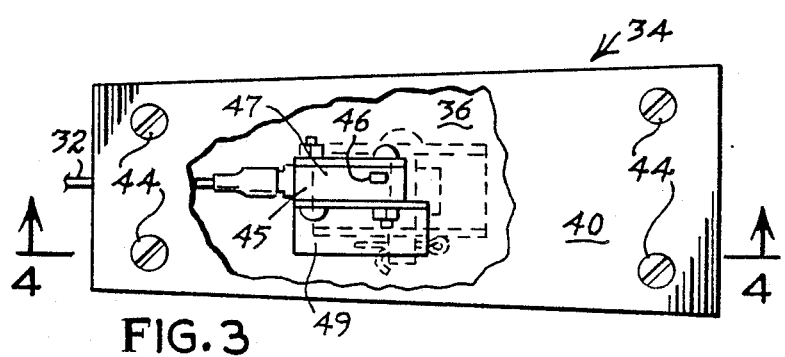

REAR SIGNAL LIGHT SYSTEM FOR AUTOMOTIVE VEHICLES

BACKGROUND OF THE INVENTION

This invention relates to a rear signal light system for an automotive vehicle, and more particularly to a signal system for warning motorists in the rear of an automotive vehicle of the deceleration of the motor vehicle.

Rear signal light systems for automotive vehicles are well known in the art as illustrated in the following U.S. patents:

| | | |
|---|---|---|
| 2,691,744 | E. Peters | Oct. 12, 1954 |
| 2,698,403 | H. D. Woodham | Dec. 28, 1954 |
| 2,740,105 | O. W. Dorfman, et al | Mar. 27, 1956 |
| 2,760,113 | A. J. Danek | Aug. 21, 1956 |
| 2,784,348 | A. J. Danek | Mar. 5, 1957 |
| 3,375,496 | A. J. Antunovic | Mar. 26, 1968 |
| 3,395,388 | J. R. Hendrickson | Jul. 30, 1968 |
| 3,676,844 | J. R. Hendrickson | Jul. 11, 1972 |
| 4,224,598 | J. F. Ostrowski | Sep. 23, 1980 |

All of the above nine U.S. patents disclose various types of illuminated deceleration signals which are located in the rear window, or in some other location on the rear, of an automotive vehicle to indicate to the operator of a trailing vehicle of the deceleration or braking of the automotive vehicle.

Most of the above patents disclose an automotive vehicle having a three-light rear signal device, including a green light, an amber light, and a red light. The green light indicates that the automotive vehicle is moving forward at constant speed or is accelerating. The amber light is connected to a switch operated by the accelerator, so that the amber light illuminates when the accelerator is released. The red light is actuated by the depression of the brake pedal.

The Antunovic patent illustrates a rear illuminated signal device which displays only a yellow or yellow-orange light when the accelerator of an automotive vehicle is released. This yellow deceleration signal is independent of the existing red brake light signal, which will illuminate when the brake is applied.

The Ostrowski patent also discloses a system in which only amber and red lights are displayed when the accelerator is released and the brake is applied, respectively.

However, all of the above patents disclose a mechanical linkage between the accelerator pedal per se and the accelerator switch which energizes the amber warning lamp.

Accordingly, in traffic hazard situations where lost seconds or fractions of seconds become critical, the linkages between an accelerator pedal and the signal lamp switch create unnecessary lost motion, inertia and consequent delayed reaction times.

SUMMARY OF THE INVENTION

It is therefore an object of this invention to provide a rear signal light system for an automotive vehicle incorporating an amber warning lamp to indicate deceleration of the automotive vehicle and a red warning lamp to indicate the braking of the automotive vehicle, in which the reaction times are substantially more rapid than other such systems in the prior art.

The rear signal light system made in accordance with this invention includes a lamp housing adapted to be mounted on the rear portion of an automotive vehicle, such as in the rear window or upon the rear bumper and supporting amber and red warning lamps clearly visible to the rear of the vehicle, and particularly to trailing motorists. The rear amber warning lamp is illuminated by an electrical accelerator switch immediately sensitive to the movement of the accelerator pedal and in electrical communication between the existing vehicle ignition system and the amber lamp. The red warning lamp is electrically connected in the existing brake switch system for illumination upon depression of the existing brake pedal.

The rear signal light system made in accordance with this invention includes an accelerator pedal member of unique construction, in which the accelerator switch is incorporated, and preferably encapsulated, within the accelerator pedal housing, so that the switch is immediately responsive to foot pressure, or the absence of foot pressure, upon the accelerator pedal treadle. In a preferred form of the invention, the accelerator pedal member includes a housing in which an electrical switch having a push-button actuator is encapsulated. The actuator is in contact with the movable tread of the accelerator pedal, or is otherwise exposed or sensitive to the pressure exerted by the operator's foot when applied to the accelerator treadle. In such an accelerator pedal-switch structure the circuit to the amber warning light is immediately responsive to the foot pressure of the operator, and therefore immediately indicates to a person to the rear of the vehicle whether the vehicle is decelerating, or either moving at a constant velocity or accelerating.

Moreover, because of the housing structure of the accelerator pedal member, the accelerator switch may be totally encapsulated within the pedal housing to maintain the accelerator switch free of exposure to dust, fumes, moisture, and other contaminants, as well as being protected from physical abuse. Accordingly, the encapsulated accelerator switch will be subject to a minimum of maintenance and adjustment, and will enjoy longer life than the exposed accelerator switch of the prior art.

The compactness of the accelerator switch within the pedal housing lends itself to inexpensive mass production.

Furthermore, because of the unique construction of the accelerator pedal member incorporating the switch member, the system may be installed upon existing automotive vehicles of different manufacturers with a minimum of effort, time, labor, and materials. The pedal member incorporating the switch may be mounted upon the existing accelerator pedal arm or link arm, without regard to the various mechanical structures and arrangements of the accelerator pedal linkages with the carburetor. Moreover, the accelerator switch may be easily connected to the existing vehicle ignition circuit, and the red warning lamp may be easily connected into the existing brake switch electrical system.

BRIEF DESCRIPTION OF THE DRAWINGS

FIG. 1 is a side elevation of a motor vehicle incorporating the rear signal light system made in accordance with this invention and shown schematically;

FIG. 2 is a schematic electrical circuit diagram of the system made in accordance with this invention;

FIG. 3 is a top plan view of the accelerator pedal member made in accordance with this invention, with portions of the treadle broken away to disclose the accelerator switch member;

FIG. 4 is a section taken along the line 4—4 of FIG. 3;

FIG. 5 is an enlarged rear elevational view of the lamp housing;

FIG. 6 is a section taken along the line 6—6 of FIG. 5; and

FIG. 7 is a rear elevational view of a modification of the lamp housing.

DESCRIPTION OF THE PREFERRED EMBODIMENTS

Figure 8:
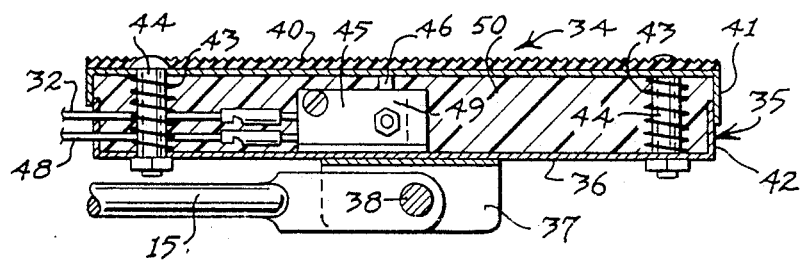
FIG. 8 is a sectional elevation of a slightly modified form of the accelerator pedal member in which the hollow space is filled with resin.

Referring now to the drawings in more detail, FIG. 1 discloses a typical automotive vehicle, such as the automobile 10, incorporating the rear signal light system 11 made in accordance with this invention. The automobile 10 includes an engine 12, carburetor 13 and carburetor linkage 14 connecting the carburetor 13 to a existing accelerator lever or link arm 15. The automobile 10 also includes a rear window 15, a rear end portion 17, and rear stop lights 18.

The electrical circuit diagram in FIG. 2 includes the electrical ignition system 20 in the automobile 10, the existing electrical brake switch system 21 and brake switch 22 in the stop light circuit 23, including the stop lights 18 in series.

The rear signal light system 11 made in accordance with this invention includes a lamp housing 25, preferably adapted to be mounted inside the rear window 16 of the automobile 10. The lamp housing 25, as illustrated in FIGS. 5 and 6, preferably includes an upper rear compartment 26 in which are mounted a pair of red warning lamps 27 connected in series in branch line 28 with the stop light circuit 23, and in parallel with the stop lights 18. The opposite end of the branch line 28 is grounded to the housing wall of the compartment 26, which in turn is grounded as illustrated by the ground line 29 in FIG. 2.

In the lower rear compartment 30 of the lamp housing 25 are mounted a pair of amber warning lamps 31. The amber lamps 31 are connected in series in a branch line 32, one end of which is grounded to the wall of the lower compartment 30, which in turn is grounded through the ground line 29.

Adapted to be mounted upon the accelerator pedal arm 15 is an accelerator pedal member 34 made in accordance with this invention. The accelerator pedal member 34 comprises an elongated housing 35, having a bottom wall 36. Fixed to the bottom surface of the bottom wall 36 is a bracket 37 adapted to be pivotally connected to the accelerator pedal arm 15 by means of a pin or bolt 38. The pin 38 and bracket 37 may be detachably connected to permit the pedal member 34 to replace the existing accelerator pedal in an automobile 10 of various types of manufacture.

In a preferred construction of the pedal member 34, the housing 35 constitutes the lower portion of the pedal member which is covered by a treadle or treadle member 40. The treadle 40 is of a length and size adapted to readily receive the foot of the motor vehicle operator for depressing the accelerator pedal arm 15 in order to operate the vehicle 10. The treadle 40, as best disclosed in FIG. 4, may have a down-turned peripheral rim or flange 41 adapted to fit over and telescopingly receive the walls 42 of the lower housing 35. The telescoping treadle pedal member 40 and the housing 35 are connected together by the coil springs 43 surrounding the spring guide posts 44. The springs 43 bias the treadle 40 upward to an inoperative position, as disclosed in FIG. 4.

Preferably, the interior of the housing 35 is hollow and completely enclosed by the bottom wall 36, the side walls 42 and the treadle 40, including its peripheral flanges 41. In the hollow space within the housing 35 is an electrical accelerator switch or switch member 45, preferably a microswitch having a casing 47 and an upward directed actuator, preferably in the form of a plunger button 46 barely engaging the lower surface of the treadle 40, as disclosed in FIG. 4. The switch casing 47 is fixedly attached to the bottom wall 36 within the hollow space of the pedal housing 35 by a bracket 49. The switch 45 is normally closed in the inoperative position of the treadle 40. However, when a minimum of foot pressure is exerted downwardly upon the treadle 40, the actuator or switch button 46 is depressed to open the switch 45.

The input lead 48 to the switch 45 is connected into the existing electrical ignition system 20 of the automotive vehicle 10, while the other side of the switch 45 is connected to the amber warning circuit line 32. Thus, the amber warning lamps 31 are illuminated when the treadle 40 is in its raised inoperative position, that is when there is no foot pressure exerted upon the accelerator treadle 40. However, when the treadle 40 is depressed, the actuator 46 is also depressed to open the switch 45 and deenergize the amber warning lamps 31.

When the conventional brake pedal, not shown, in the motor vehicle 10 is depressed to close the brake switch 22, not only are the conventional stop lights 18 energized, but also the red warning lamps 27 within the lamp housing 25 are illuminated to indicate that the motor vehicle 10 is decelerating rapidly, and probably to a complete stop.

The illumination of the amber warning lamps 31 indicates to the trailing motorist that the automotive vehicle 10 is decelerating, but only under the inertia of the vehicle 10 and not by means of the application of the brakes. Of course, upon application of the brakes, both the amber lamps 31 and the red warning lamps 27 will be illuminated simultaneously to indicate to the trailing motorist that motor vehicle 10 is decelerating rapidly and probably coming to a complete halt.

Because the accelerator switch actuator 46 is located immediately below and contiguous with the treadle 40, there is no lost motion between the depression of the treadle 40 and the opening of the switch member 45. Moreover, when the foot pressure is removed from the treadle 40, both the actuator 46 and the treadle 40 are immediately raised simultaneously by the coil springs 43 to immediately close the switch member 45 and illuminate the amber lamps 31.

It will be understood that other forms of the accelerator pedal member 34 may be utilized than that disclosed in FIGS. 3 and 4. For example, the actuator switch button could extend through an opening in the treadle so that when the operator's foot moves downward to engage the treadle 40, the switch button will also be depressed simultaneously. It is also possible for the housing 35 to be unitary with the treadle 40 and the actuator 46 to project lightly above the upper surface of the treadle 40 so that only the actuator button 46 will be depressed while the treadle is stationary relative to the rest of the pedal housing 35.

Moreover, preferably, the hollow space within the pedal member 34 is filled with protective material, such as resin 50, to completely encapsulate the switch member within the housing and thereby protect the switch member 45 from any external contaminants, such as dust, moisture, or mechanical abuse. Furthermore, the elimination of the linkages between the switch member 45 per se and the accelerator treadle 40 minimizes the number of parts or components which might become defective from wear or damage, as well as minimizing the reaction time between the movement of treadle 40 and the illumination of the amber lamps 31.

It will also be understood that any number of amber lamps 31 or red warning lamps 27 may be mounted within the respective compartments 30 and 26 without affecting the operation of the system 11.

FIG. 7 merely discloses an alternative housing 50 for receiving existing brake lights or stop lights 18 at each end, and for receiving the amber lamps 31 in a central compartment 51. The housing 50 is particularly adapted for mounting on the rear ends of tractor-trailer vehicles, vans, campers, or other types of heavier motor vehicles. The housing 50 may be in the form of the rear bumper of the vehicle.

It is therefore apparent that a rear signal light system 11 has been designed for an automotive vehicle 10 which is more responsive and more sensitive to the activation of the accelerator pedal by the operator's foot in energizing and de-energizing the amber warning lamps. Moreover, the system 11 includes a unique brake pedal-switch unit which is susceptible to a longer life than accelerator switches in the prior art. All of the components and parts of the electrical circuitry of the system 11 may be easily connected and assembled into an existing automotive vehicle and are adapted to be mounted in automotive vehicles of various models and types. Furthermore, the components and parts of the system 11 are adaptable to be mass produced at a minimum of cost.

What is claimed is:

1. A signal light system for an automotive vehicle having a rear portion, an electrical brake switch system, a carburetor, an accelerator link arm cooperatively connected to the carburetor, and an electrical ignition system, comprising:
   (a) an electrical amber warning lamp,
   (b) means mounting said amber warning lamp in the rear portion of an automotive vehicle and visible to the rear of said vehicle,
   (c) an accelerator pedal member comprising a pedal housing having an upper portion and a lower portion, an enclosing bottom wall and side walls, and a treadle on said upper portion, defining a hollow space within said pedal housing, guide post means connecting said treadle to said bottom wall, and spring coil means surrounding said guide post means and biasing said treadle upward upon the absence of downward pressure by the operator's foot,
   (d) means mounting said bottom wall of said pedal housing on the accelerator link arm of a motor vehicle,
   (e) an accelerator electrical switch member comprising a microswitch having a switch casing,
   (f) means fixing said switch casing on said bottom wall within said hollow space,
   (g) said microswitch having a normally closed circuit position and an open circuit position,
   (h) said microswitch member comprising a movable switch actuator projecting upward from said switch casing in the upper portion of said pedal housing and adapted to change the mode of said microswitch between said closed circuit position and said open circuit position,
   (i) said microswitch being electrically connected in series solely between the electrical ignition system of the automotive vehicle and said amber warning lamp,
   (j) an electrical red warning lamp,
   (k) means mounting said red warning lamp in the rear portion of said automotive vehicle, and visible to the rear of said vehicle,
   (l) said red warning lamp electrically connected in the electrical brake switch system of said automotive vehicle for illumination solely when said brake switch system is energized,
   (m) said switch actuator being adapted to move downward to change the mode of said microswitch to said open circuit position simultaneously with the downward pressure on said switch actuator by the operator's foot on said treadle, whereby said amber lamp is not illuminated, and
   (n) said switch actuator being adapted to move upward to change the mode of said microswitch to said closed circuit position when the downward pressure on said switch actuator by the operator's foot on said treadle has been removed, to continuously illuminate said amber lamp as long as said microswitch is in said closed circuit position, the illumination of said amber warning lamp and said red warning lamp being independent of each other.

2. The invention according to claim 1 in which said treadle is in continuous contiguous engagement with said switch actuator.

3. The invention according to claim 1 further comprising protective resin material filling said hollow space within said pedal housing and encapsulating said microswitch.

* * * * *